No. 655,845. Patented Aug. 14, 1900.
A. G. WINTER.
METHOD OF FIREPROOFING CELLULOSE.
(Application filed Mar. 30, 1900.)
(No Model.)
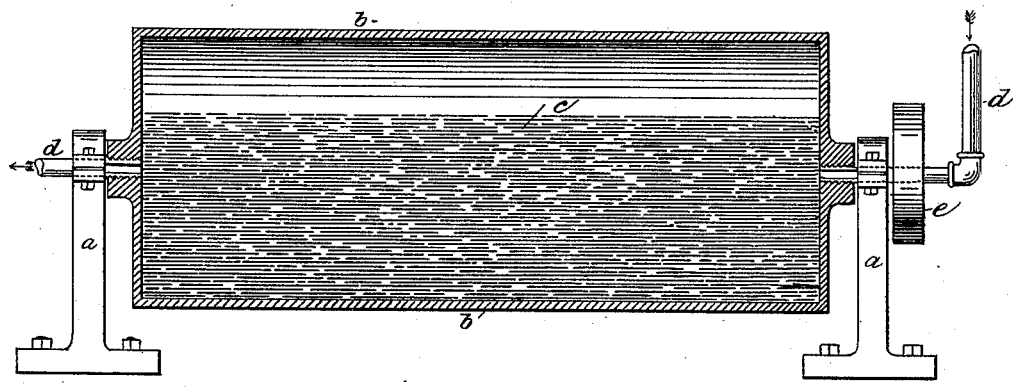

UNITED STATES PATENT OFFICE.

AUGUSTUS G. WINTER, OF OWENSBOROUGH, KENTUCKY.

METHOD OF FIREPROOFING CELLULOSE.

SPECIFICATION forming part of Letters Patent No. 655,845, dated August 14, 1900.

Application filed March 30, 1900. Serial No. 10,833. (No specimens.)

*To all whom it may concern:*

Be it known that I, AUGUSTUS G. WINTER, a citizen of the United States, residing at Owensborough, in the county of Daviess and State of Kentucky, have invented new and useful Improvements in Processes of Preparing and Fireproofing Cellulose, of which the following is a specification.

The cellulose herein referred to is a substance made from the pith of Indian corn or other pithy plant.

My invention relates to the process of impregnating the cellulose with salammoniac or some other salt which will render the composition uninflammable at a temperature of about 1,000°. Salammoniac has heretofore been constantly used as a fireproofing material to be mixed with cellulose; but in the processes heretofore used it has been necessary to introduce a large amount of water into the composition, which it was then necessary to expel at great cost. Furthermore, under the old processes the various grains of cellulose were saturated in the solution of salammoniac, by reason of which the air-cells after the water was expelled remained filled with salammoniac.

The object of my invention is to afford a means by which the fireproofing salt may be mingled with the cellulose without the introduction of any considerable amount of water and, furthermore, of doing it in such a manner as not to fill the air-cells, and thus interfere with any of the expansive qualities of the cellulose.

It is understood that the usefulness of cellulose is entirely due to its capacity for enormous and almost instantaneous expansion when brought into contact with water. This expansion is caused in great part by the water permeating these air-cells. By reason of the fact that in cellulose prepared according to my process the cells are free from salammoniac it has been practically proven that the expansive capacity is increased about one hundred per cent.

My mode of fireproofing the cellulose is as follows: The substance, which is ordinarily manufactured in grains averaging about one-eighth of an inch in diameter, is placed in a revolving drum. In this drum is placed the requisite quantity of salammoniac or other salt. The drum is then rapidly revolved while a current of hot steam or hot air is injected into it for about a half-minute. The mixing can be done in other forms of receptacle while the current of steam or air is passed through them; but the use of a revolving drum is far more convenient and practicable. The heat causes the moisture in the grains to come to the outside, thus affording an adhesive surface, to which the salammoniac attaches itself. The cells within the grains are therefore left unoccupied, and the moisture in the composition is not increased except to a very slight degree, occasioned by the use of steam as a heating agent. This increase is so slight that I consider it no obstacle to the use of steam for this sweating operation. Hot air may be injected instead; but I find the use of steam to be more satisfactory.

The drawing represents a vertical section of the drum which I prefer to use.

In said drawing, *a a* represent the supports of the drum.

*b b* represent the drum itself.

*c* represents the cellulose in the drum.

*d d* represent the pipes or apertures in the drum, through which the steam enters.

*e* represents a pulley by which the drum may be revolved.

It will be observed that after treatment under my process the composition is ready to be pressed into cakes as it is taken from the drum, while under the old processes of saturating the cellulose with a solution of salammoniac it is necessary to expel the moisture in order to reduce the amount to the normal—that is, about ten per cent.—beyond which the cellulose begins to lose its efficiency in proportion to weight and is apt to deteriorate by reason of mildew or decay. Another merit of my process is that by it the salt is made to evenly permeate the finished product throughout. In processes in which saturation is used this is impossible by reason of the immense rapidity with which the solution is absorbed.

The salammoniac or other salt used in my process should be very finely pulverized.

What I claim as my invention, and desire to secure by Letters Patent, is—

1. The process of rendering cellulose fireproof by mixing it with a dry incombustible salt in a heated receptacle, substantially as described.

2. The process of rendering cellulose fireproof by mixing it with salammoniac in a heated receptacle, substantially as described.

3. The process of rendering cellulose fireproof by mixing it with salammoniac in a receptacle, into which is introduced steam, substantially as described.

4. The process of rendering cellulose fireproof by bringing the natural moisture in each grain to the surface by means of heat, and bringing the moisture in contact with a pulverized salt, all substantially as described.

5. The process of impregnating cellulose with pulverized salammoniac by bringing them into contact in the presence of steam.

AUGUSTUS G. WINTER.

Witnesses:
 JOS. MCWILLIAMS,
 SOPHIA KURN.